(12) United States Patent
Leigh et al.

(10) Patent No.: US 10,795,521 B2
(45) Date of Patent: Oct. 6, 2020

(54) PRESSURE AND SHEAR SENSOR

(71) Applicant: Tactual Labs Co., New York, NY (US)

(72) Inventors: Darren Leigh, Round Hill, VA (US); Adam Landa, Forest City, FL (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/331,255

(22) PCT Filed: Sep. 7, 2017

(86) PCT No.: PCT/US2017/050547
§ 371 (c)(1),
(2) Date: Mar. 7, 2019

(87) PCT Pub. No.: WO2018/049070
PCT Pub. Date: Mar. 15, 2018

(65) Prior Publication Data
US 2019/0212844 A1    Jul. 11, 2019

Related U.S. Application Data

(60) Provisional application No. 62/384,335, filed on Sep. 7, 2016.

(51) Int. Cl.
*G06F 3/044* (2006.01)
*G01L 1/14* (2006.01)
(Continued)

(52) U.S. Cl.
CPC .............. *G06F 3/044* (2013.01); *G01L 1/146* (2013.01); *G06F 3/016* (2013.01);
(Continued)

(58) Field of Classification Search
CPC ......... G06F 3/0414; G06F 2203/04106; G06F 2203/04104; G06F 2203/04105;
(Continued)

(56) References Cited

U.S. PATENT DOCUMENTS

| 6,520,030 | B1 * | 2/2003 | Jiang ........................ G01L 1/205 73/862.06 |
| 2012/0013571 | A1 * | 1/2012 | Yeh .......................... G06F 3/044 345/174 |

(Continued)

*Primary Examiner* — Sanjiv D. Patel
(74) *Attorney, Agent, or Firm* — Adam B. Landa

(57) ABSTRACT

A sensor for sensing contact with an outside object is disclosed. A sensor stackup has top surface, having an outer skin adapted for contact with the outside object. The stackup also including, a deformable layer below top surface in the stackup, the deformable layer including patches made from conductive or high dielectric material. The stackup further including a capacitive sensor layer below the deformable layer, the capacitive sensor layer comprising conductors that are insulated from the patches. Each of the patches is displaceable with respect to the capacitive sensor layer in response contact with the outside object. The stackup also includes a backing layer below the capacitive sensor layer in the stackup. The sensor further includes capacitive sensor circuitry operatively connected to the capacitive sensor layer, the capacitive sensor circuitry configured to detect changes in capacitive coupling between the conductors of the capacitive sensor layer resulting from displacement of the patches with respect to the capacitive sensor layer.

19 Claims, 5 Drawing Sheets

(51) Int. Cl.
*G06F 3/041* (2006.01)
*G06F 3/01* (2006.01)

(52) U.S. Cl.
CPC .............. *G06F 3/04146* (2019.05); *G06F 2203/04103* (2013.01); *G06F 2203/04105* (2013.01)

(58) Field of Classification Search
CPC . G06F 3/041–048; G06F 3/044; G01L 1/146; G01L 1/247
See application file for complete search history.

(56) References Cited

U.S. PATENT DOCUMENTS

| | | | |
|---|---|---|---|
| 2012/0229306 A1* | 9/2012 | Lin | G06F 3/0202 341/22 |
| 2015/0091859 A1* | 4/2015 | Rosenberg | G06F 3/045 345/174 |
| 2016/0139716 A1* | 5/2016 | Filiz | G06F 3/0416 345/174 |
| 2017/0177114 A1* | 6/2017 | Frey | G01L 1/146 |
| 2018/0226210 A1* | 8/2018 | Varghese | H01H 13/83 |

* cited by examiner

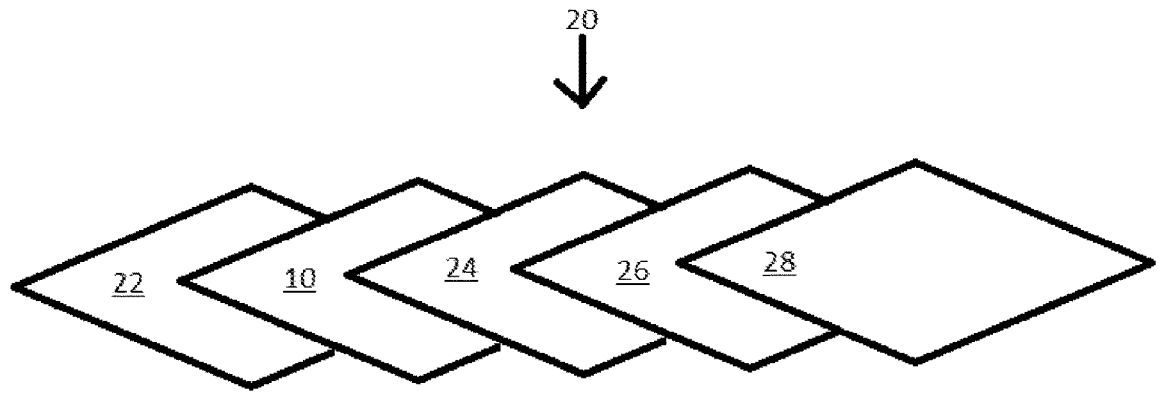
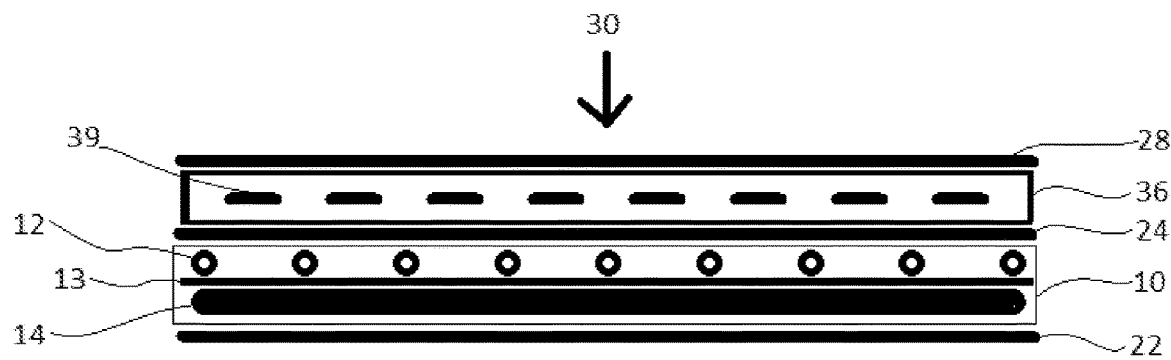
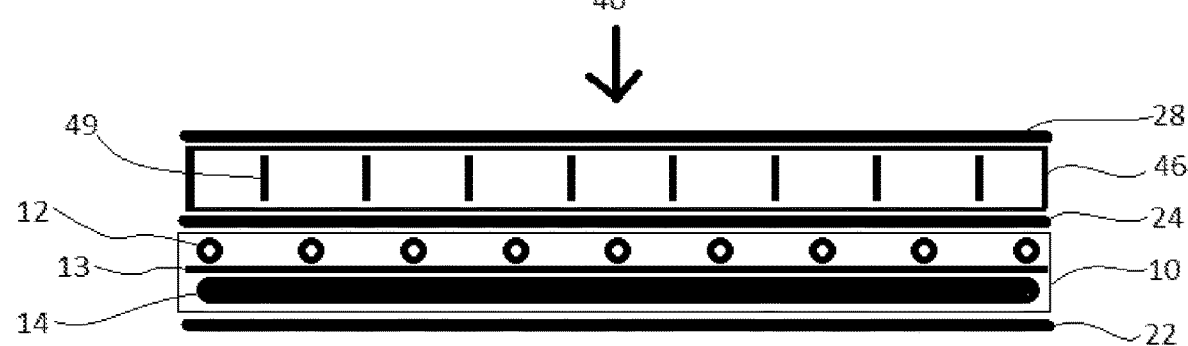

Fig. 8
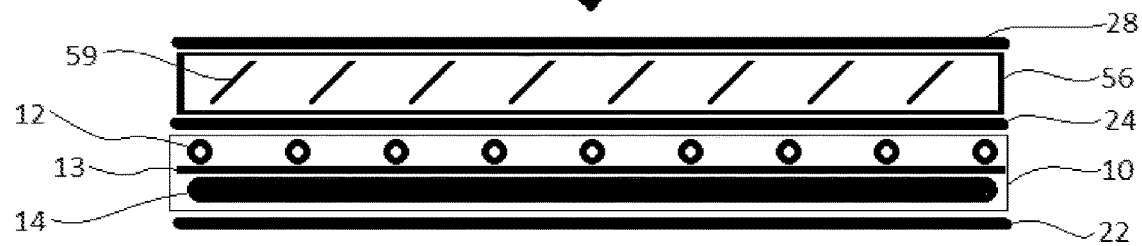
Fig. 9
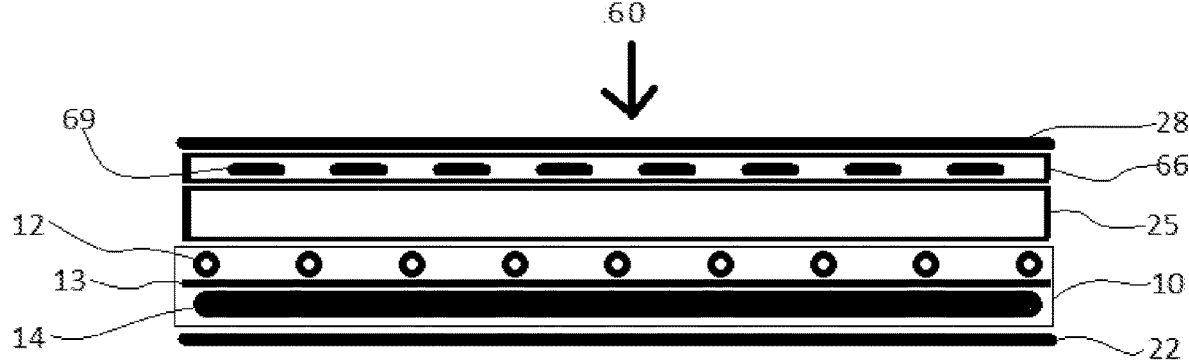
Fig. 10
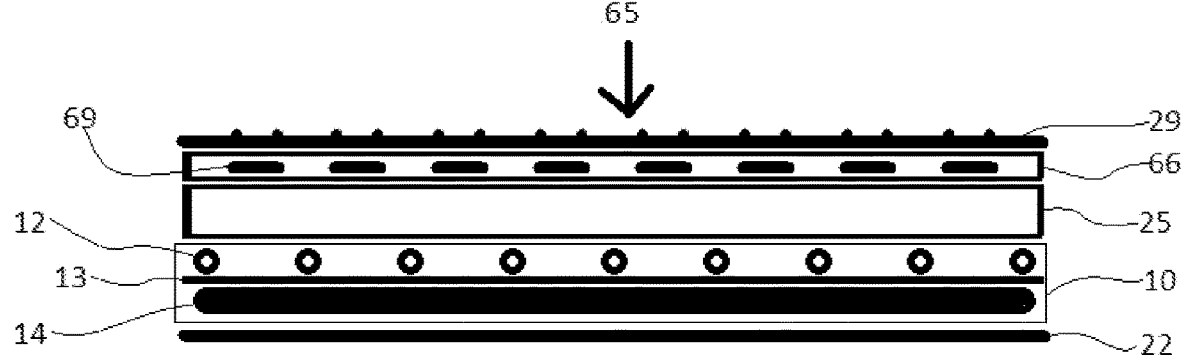

PRESSURE AND SHEAR SENSOR

This application is a non-provisional of, and claims priority to, U.S. Provisional Patent Application No. 62/384,335, filed on Sep. 7, 2016 and entitled ROBOTIC SENSING WITH FAST MULTITOUCH SENSOR. This application relates to fast multi-touch sensors such as those disclosed in U.S. patent application Ser. No. 15/099,179 entitled "Capacitive Sensor Patterns" filed Apr. 14, 2016, and touch and hover sensitive objects such as those disclosed in U.S. Provisional Patent Application No. 62/379,649 entitled "Touch Sensitive Objects", the entire disclosures of which are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems and methods relate in general to the field of capacitive input sensing, and in particular to detecting pressure and/or shear force using a capacitive input sensor.

BACKGROUND OF THE INVENTION

For many years, engineers have been designing tactile sensing systems to enable robotic "hands" to grasp and manipulate objects. Grasp, which comes so naturally to humans, is actually quite complicated, and to accomplish grasp requires sensors that can detect and react to the correct forces. Many attempts have been made to design such sensors. For example, there are many industrial applications where objects need to be manipulated during assembly line construction. The automobile industry is a good example. Industrial robots lift and move automobile components so that a frame can be assembled as it moves along an assembly line.

Applications within and without industry require a machine to quickly and accurately sense grasp so that robotics can be used to quickly handle even delicate objects. Systems have for some time existed that enable a robotic "hand" to sense pressure applied to a particular object within its grasp, pressure sensing systems are generally slow, complicated, expensive, and/or do not do an adequate job. Solutions have been proposed to use capacitive sensing in robotic grip to provide a less expensive system for providing sheer feedback. One such attempt was the application of capacitance sensing technology that was used in touchpads to the tactile sensing problem. U.S. patent application Ser. No. 11/677,497 entitled SYSTEM FOR PROVIDING TACTILE SENSATION TO A ROBOTIC GRASPING MECHANISM USING CAPACITANCE TOUCHPAD TECHNOLOGY describes such an attempt using a capacitance sensitive touchpad, wherein X and Y electrode grids are separated by a resilient but deformable material, such as a gel or other rubber-like material, wherein an object coming into contact with the touchpad causes the resilient material between the electrode grids to be compressed, and wherein the touchpad is capable of determining the change in distance between the electrode grids and thereby determine the amount of force being applied to the touchpad to cause the detected compression of the resilient material. Although this proposed solution may be capable of detecting touch events, it is unable to detect all of the correct forces that are needed for robotics to understand and respond to the thereby unmeasured nuances of grasp.

BRIEF SUMMARY OF THE INVENTION

It is an object of this disclosure to provide a sensor that can detect grasp in a manner that permits robotics to better (e.g., more quickly, more firmly) handle objects.

It is a further object of this disclosure to provide a sensor that can detect grasp in a manner that permits robotics to better handle delicate objects.

It is also an object of this disclosure to provide a sensor that can detect pressure and/or shear force.

It is yet a further object of this disclosure to provide a sensor that can detect pressure and/or shear force with the speed and accuracy required for robotic grip application.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

FIG. 5 is a high level schematic of an embodiment of a sensor stackup for a pressure or shear sensor.

FIG. 6 is an illustration of an embodiment of a sensor stackup having horizontal conductive elements for a pressure or shear sensor disclosed herein.

FIG. 7 is an illustration of an embodiment of a sensor stackup having vertical conductive elements for a pressure or shear sensor disclosed herein.

FIG. 8 is an illustration of an embodiment of a sensor stackup having diagonal conductive elements for a pressure or shear sensor disclosed herein.

FIG. 9 is an illustration of another embodiment of a sensor stackup having horizontal conductive elements for a pressure or shear sensor disclosed herein.

FIG. 10 is an illustration of yet another embodiment of a sensor stackup having horizontal conductive elements for a pressure or shear sensor disclosed herein.

DETAILED DESCRIPTION

Figure 1:
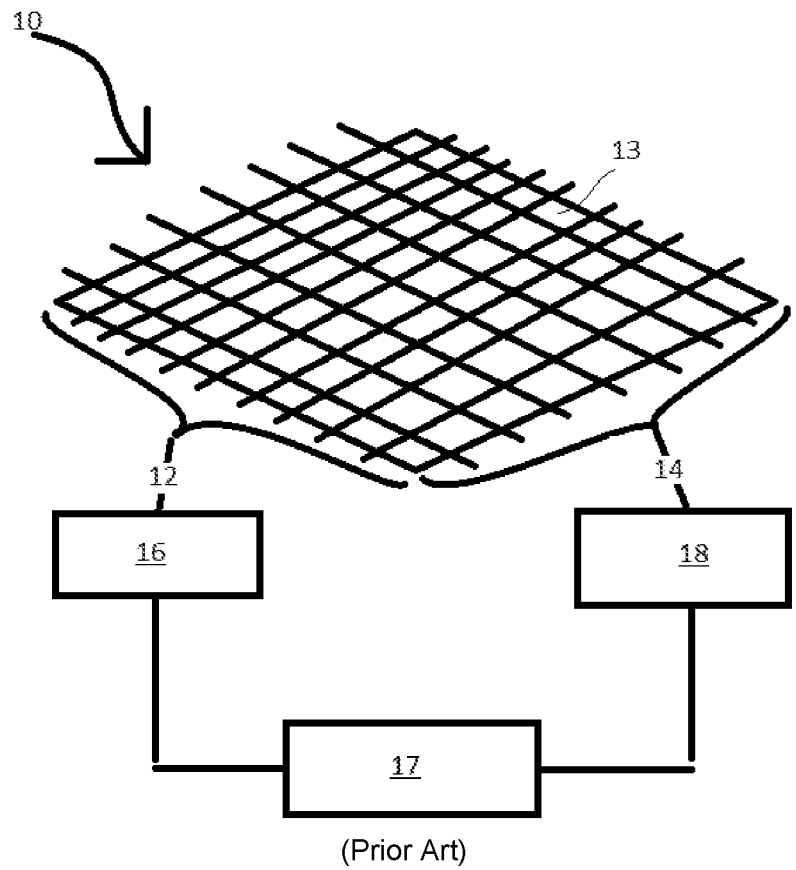
FIG. 1 is a high level schematic of one embodiment of a capacitive sensor.

Over the past several years, capacitive sensing, including fast multi-touch (FMT) sensing (as disclosed in U.S. Pat. No. 9,019,224), have been employed in touch screen applications. Turning to FIG. 1, generally, a capacitive sensor 10 has conductors 10, 12 arranged in a grid and separated by an insulator. (The conductors are at times referred to as rows and columns.) Circuitry 16, 18 operatively connected to the conductors 10, 12, the circuitry is used to stimulate and sense signals the conductor grid. In some embodiments, one set of conductors 10, 12 is stimulated, and the other sensed. In other embodiments, both sets of conductors 10, 12 may be both stimulated and sensed. In some embodiments, the conductors 10, 12 that are stimulated are stimulated one at a time, in other embodiments, multiple conductors are stimulated at the same time. Moreover, although the conductors as illustrated are arranged in a grid, as discussed in U.S. Pat. No. 9,019,224, that need not be the case. Moreover, co-pending U.S. patent application Ser. Nos. 15/690,242 and 15/690,243 describe single edge and single sided conductor arrangements. Once received, the sensed signals may be analyzed to identify touch. A signal processor 17 may be employed to analyze the sensed signals to identify touch.

Figure 2:
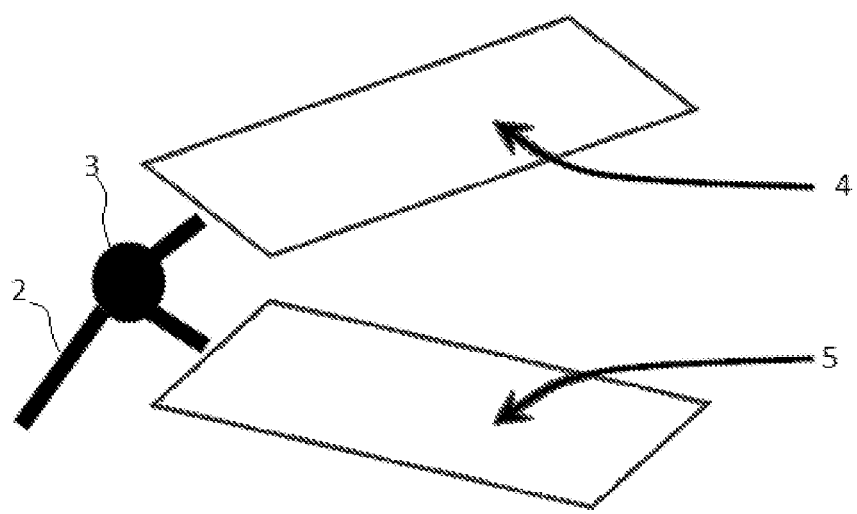
FIG. 2 is an illustration of a utility gripper on a robot that can sense what it is grasping.

Turning to FIG. 2, a simple robotic gripper is shown. Structural components 2 are connected to a moving joint 3 that is operatively connected to a first and second gripper. The first and second grippers can determine touch, pressure and shear. The simplicity of the illustrated robotic gripper is not intended to limit the scope of the disclosure (which is done only in the claims), but rather, to provide a simple illustration for discussion purposes. The sensor discussed herein are applicable to simple and complex robotic structures as well as other applications where gripping, pressure and/or shear are important measures.

Used in grip applications, the sensor may be used to determine how and where a gripping surface (shown) or e.g., fingers (not shown), touch an object surface. The disclosed sensor is also applicable to being used in tactile sensing applications for robotics. Robotic tactile sensing can be for both industrial robotic applications (allowing robot manipulators, surfaces and other appendages to sense things that they are touching or that are touching them) or for social applications, allowing a robot to sense things in a manner similar to a human being and react accordingly.

Figure 3:
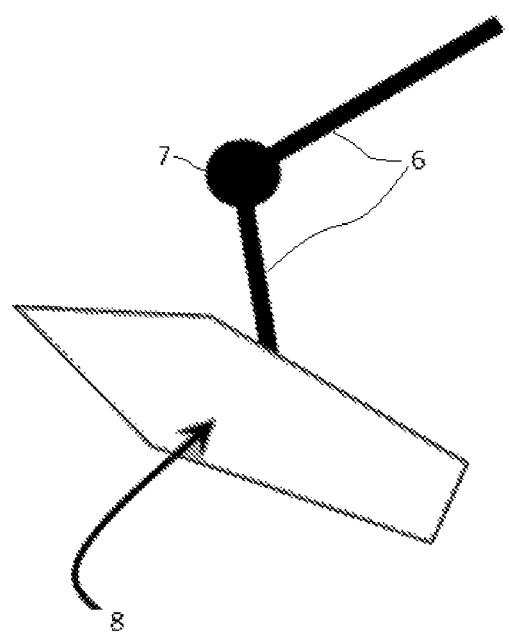
FIG. 3 is an illustration of a pressure sensor on the bottom surface of a robot foot.

Turning briefly to FIG. 3, a simple robotic foot is shown. Structural components 6 are connected to a moving joint 7. Other joints (not shown) may be employed. A touch/pressure/shear sensor 8 is disposed on the bottom of the foot.

Utility Sensing for Robotics

Returning to FIG. 2 briefly, in an embodiment, a robot used for utility purposes needs to be able to tactily sense things in its environment. A robotic hand, gripper 4, 5 or manipulator may be able to "feel" the objects that it is grasping or manipulating, using a 2-D pressure sensor, so that it can gain some knowledge about the object and be able to interact more appropriately. This could allow the robot to apply on the appropriate amount of force to pick up an object (smaller force for lighter object, larger force for heavier objects), and also to determine the shape of the object it touches. This could allow the robot to determine the shape and orientation of the object that it touches, and to be able to grasp and move the object in an appropriate way, given what it has determined about the object's size, shape, mass, mass distribution, rotational inertia tensor, surface friction and slipperiness, etc.

Returning to FIG. 3, briefly, a robotic foot, wheel or other support system can have a 2-D pressure sensor 8 on the contact surface, allowing the texture of the surface to be measured as the robot (or other supported object) puts weight on the foot, wheel or other support system on a particular spot on the floor (or ground, etc.). This will allow the robot to avoid stepping on other objects, or be able to gauge the texture of the surface on which it is standing (or moving) allowing it to change gaits or other movement strategies.

Figure 4:
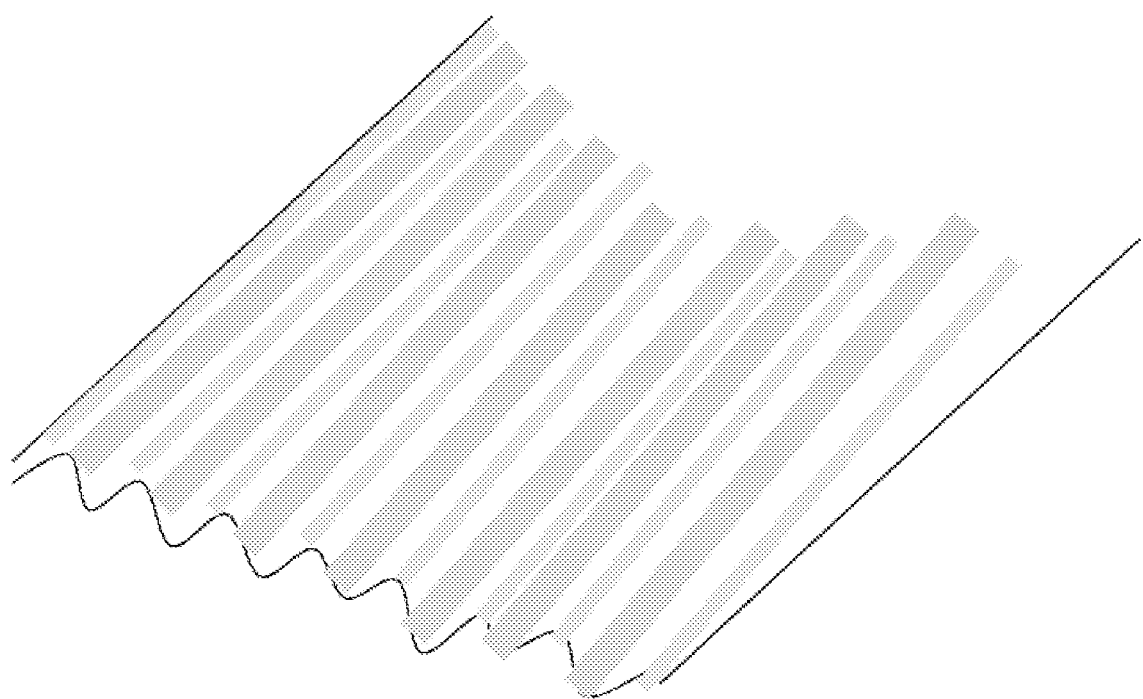
FIG. 4 is an illustration of a ridged sensor surface.

Turning to FIG. 4, ridges on "skin" surface may be used to deform the sensor surface as it is rubbed against another surface or object. The deformations cause distance changes within the sensor which register as pressure at certain places and in certain directions on the disclosed 2-D touch sensor. Instead of ridges, bumps (not shown) can be used to allow the rubbing to be measured in all lateral directions. The pattern of the ridges or the pattern of the bumps can be different in different lateral directions, allowing the 2-D pressure sensor to determine the direction of the rubbing action and gauge some properties about the surface or object that is rubbing the sensor (surface friction or slipperiness, bumps and shape, etc.).

Social Sensing for Robotics

Two dimensional pressure sensors can be used on the surface "skin" of a social robot to mimic the sense of touch in fine-grained way. The 2-D pressure sensor described here can be placed on appropriate surfaces of the social robot to measure how a human touches those spots and in what way.

Handshake simulator: In an embodiment, 2-D pressure sensors on a robotic "hand" can determine if it is being touched, the amount of pressure that the human hand applies, where the human's fingers are and how their hand is oriented, allow the robotic hand to apply the appropriate pressure at the appropriate places on the human hand, and place the robot fingers in the appropriate places and with the appropriate pressures, mimicking a human handshake.

In an embodiment, a sensor enables the ability to determine whether a human is touching a robot surface. For example, the sensor can enable a robot to distinguish between, e.g., where a human is touching a robot on its shoulder or giving the robot a back rub. Sensing software in a robot can determine the location, orientation, pressure and types of touches, thus permitting an appropriate response—in much the same way humans can tell the difference between and hug and a "touch-similar" grab, i.e., a grab of the robot where the touch contact is largely the same. A robot can then have the appropriate response. Similarly, a robotic pet, for example (e.g., a cat or dog) can respond to touches by a human by sensing whether the touches are petting actions or threatening actions, and responding in the desired manner, for example, responding in the way its non-robotic analog would.

Sensor Fusion and Other Sensing Modalities

Other sensing modalities can be added to the pressure sensing, and the sensor fusion used to determine other relevant characteristics of the touching action. In an embodiment, capacitive sensing can be combined with (or used instead) of 2-D pressure sensing, allowing the robot (or other smart object) to determine some information about the conductivity or dielectric of the touching object, as well as its capacitive connection to the environmental ground. This may allow the robot to tell whether it is being touched by a non-conductive object (such as a wooden stick) or by something more conductive (such as a human hand). In an embodiment, hover sensing (see, e.g., U.S. Patent Application No. 62/488,753), and possibly capacitive hover sensing (see, e.g., U.S. patent application Ser. No. 15/224,266) can be added so that a robot can determine when an object is near its surface but not in contact. In an embodiment, flexure sensing can be added, and will probably be part of any rubbing sensors (with ridges and bumps). In an embodiment, vibration sensing can be added and combined with the above, possibly as part of the existing 2-D pressure sensing/ capacitive sensing technology or via the use of additional vibration sensors. In an embodiment, temperature sensing, probably via the addition of separate temperature sensors.

Remote Interaction

Instead of a single human and a single robot, the sensor can be used for remote interaction between humans (or animals or other robots). For example, two human and two handshake robots can be used so that the human can shake hands remotely, while "feeling" the other person's hand, their pressure, the position of their fingers, etc. Another example would be remote backrubs, where two humans and two robots can be used to provide a remote backrub. One human would rub or massage the back of their local robot, and this human's actions, pressure, the position and orientation of their hands and fingers, etc. (possibly the temperature of their hands, the slipperiness of their hands, etc.) would be transmitted to a robot on the other end, which would intelligently mimic the actions, providing a realistic background to the human on the other end. Many such remote interactions are possible.

Reactions to Sensing

With the added sensing capabilities described here, the robot could take actions according to the nature and characteristics of the sensed touching actions. In an embodiment, the robot could avoid the touch, by moving away, changing its position, orientation, etc. In an embodiment, the robot could show a "startle" reflex, by jumping or quickly moving. In an embodiment, the robot could change shape. In an embodiment, the robot could change its position, orientation or other parameters in order to optimize the sensed pressure or pattern of pressure pattern, increasing or decreasing the pressure at the appropriate sensed places. In an embodiment, the robot could optimize its position or orientation, or the relative positions or orientations of its component parts. In an embodiment, the robot could grasp the touching object, determine the orientation of the object and possibly change the position or orientation of the object. In an embodiment, the robot could change temperature of portions of the area in contact with (or otherwise sensed by) the touching object. In an embodiment, the robot could use knowledge of the various parameters of the touch to bring other sensors to bear on the sensed object.

Construction

In an embodiment, two-dimensional touch sensors appropriate for the above applications can be built using projective-capacitive multi-touch sensing technology, see e.g., U.S. Pat. No. 9,019,224). In an embodiment, a deformable layer can be introduced in proximity to (e.g., on top of) a sensor layer 10 (FIG. 1) which can cause capacitive sensing to be converted into pressure sensing. As a conductive (or dielectric) object approaches the sensor layer 10, the amount of effect it has on the capacitive touch sensor 10 increases. In an embodiment, the deformable layer applies pressure back onto the touching object, thus the distance between the touching object and the sensor layer 10 are related to the pressure of the touching object. For example, a light touch on the deformable surface will only allow the touching object to approach to a certain distance from the sensor layer 10. A heavier touch will get the touching object closer to the sensor layer 10. Thus, pressure can be measured via capacitance.

Turning to FIG. 5, a sensor stackup 20 is shown. In an embodiment, the sensor stackup 20 can be used to measure pressure caused by non-conductive objects. In an embodiment, the sensor stackup 20 can mitigate the capacitive or dielectric effects of the touching object. In an embodiment, the sensor stackup 20 can eliminate the capacitive or dielectric effects of the touching object. The sensor stackup 20 includes a backing layer 22. In an embodiment, the backing layer 22 insulates the stackup 20 from its mounting and/or environment. In an embodiment, the backing layer 22 contains electrostatic shielding. In an embodiment, the backing layer 22 contains a ground plane. In an embodiment, the backing layer 22 contains a ground plane that provides electrostatic shielding. A sensor layer 10 provides conductors (e.g., 12, 14 in FIG. 1) that are attached to circuitry to stimulate and sense as described above. In an embodiment, the sensor layer comprises row and column conductors 12, 14 separated by an insulator 13. A separator 24 may optionally be placed between the sensor layer 10 and a deformable layer 26.

In an embodiment, deformable layer 26 contains conductive or high dielectric patches that alter the capacitance between the conductors 12, 14 as they get closer to or farther from the sensor layer 10. Deformable layer 26 can be made from various suitable materials. For example, the deformable layer 26 may comprise gels, rubber and rubber-like materials, solid foams, open-cell foams, closed-cell foams, and similar materials. In an embodiment, the deformable layer 26 material (i.e., other than the patches) should exhibit a property of returning to an original shape after being deformed by application of force after the force is removed. In an embodiment, the deformable layer 26 material is non-conductive. In an embodiment, the deformable layer 26 material is an insulator. In an embodiment, the deformable layer 26 is made from a composite of patches and other materials. In an embodiment, the deformable layer 26 is formed from one or more layers of non-conductive materials with a plurality of patches embedded therein.

A top surface 28 is optionally provided; the top surface interacts with the world outside the sensor. In an embodiment, the top surface 28 is flexible. In an embodiment, the flexible top surface 28 protects the deformable layer 26. In an embodiment, the top surface 28 has a ridged or contoured outer surface to engage with an object rubbing against. In an embodiment, rubbing or shear is detected a direction parallel to the surface and perpendicular to the ridges (e.g., due to deformations) thus allowing the surface sensor to detect the rubbing motion. In an embodiment, an array of bumps can be used, allowing shear to be detected in any direction that is parallel to the surface.

In an embodiment, the conductive or high dielectric patches are about the size of the sensor's touch resolution and are electrically insulated from each other. In an embodiment, the separator 24 is a non-conductive layer that separates the sensor layer 10 from the deformable layer 26. In an embodiment, the separator 24 is flexible.

As an object touches the top surface 28, the conductive patches are displaced toward the capacitive sensor, changing the capacitive coupling between the sensor's conductors 12, 14. As more pressure is applied, the deformable layer 26 deforms farther and the distance between the conductive patches and the sensor layer 10 decreases, changing the coupling between the sensor's conductors 12, 14 even more. In an embodiment, the top surface 28 includes a conductive layer to mitigate conductive, dielectric and/or capacitive effects of the touching object. In an embodiment, the conductive layer of the top surface 28 is insulated from the conductive patches. In an embodiment, a conductive layer of the top surface 28 to completely decouples conductive, dielectric and/or capacitive effects of the touching object. In an embodiment, the backing layer 22 includes a conductive layer. In an embodiment, the top surface 28 and the backing layer 22 include a conductive layer. In an embodiment, the top surface 28 and the backing layer 22 each include a conductive layer so that electrical effects are mitigated or eliminated from inside the stackup 20 (i.e., between the conductive layers), leaving contact as the external influence; contact causes physical displacement of the conductive patches inside the stackup 20.

Turning to FIG. 6, an embodiment of a sensor stackup 30 is shown. A sensor layer 10 is provided. In an embodiment, the sensor layer 10 comprises conductors 12, 14 insulated from each other. In an embodiment, the conductors 12, 14 are on opposite sides of an insulator 13. A deformable layer 36 in a layer above the sensor layer 10. In an embodiment, a separator 24 is used between the sensor layer 10 and the deformable layer 36. Patches 39 are distributed throughout at least a portion of the deformable layer 36. In an embodiment, the patches 39 are approximately the size of the touch resolution of the sensor. In an embodiment, the patches 39 are at least the size of the touch resolution of the sensor. In an embodiment, the patches 39 are oriented so that they are parallel to the deformable layer 36. In an embodiment, and optional backing layer 22 is provided. In an embodiment, the backing layer 22 comprises a conductive layer. In an embodiment, a top surface 28 provides an interface between the sensor stackup 30 and the outside world. In an embodiment, the top surface 28 comprises a conductive layer.

The deformable layer 36 can be physically deformed by touch on the top surface 28, thus displacing the patches 39 towards the sensor layer 10, and changing the capacitive coupling between the conductors 12, 14. In an embodiment, top surface 28 is made from material selected to have a meaningful coefficient of static friction when engaged with a touching object, thereby permitting a sliding or rubbing action to displace the patches 39 in the deformable layer 36 such that the they change the capacitive coupling between the conductors 12, 14. In an embodiment, the top surface has ridges, bumps or dimples that cause deformation in the deformable layer 36, and thus, displacement of the patches 39, and thus a change in the capacitive coupling between the conductors 12, 14, when touched.

Turning to FIG. 7, another embodiment of a sensor stackup 40 is shown. The sensor stackup 40 in FIG. 7 differs from the sensor stackup 30 in FIG. 6 in that a deformable layer 46 has patches 49 oriented perpendicular to the layer. In an embodiment, the patches 49 are approximately the size of the touch resolution of the sensor. In an embodiment, the patches 49 are at least the size of the touch resolution of the sensor.

Turning to FIG. 8, yet another embodiment of a sensor stackup 50 is shown. The sensor stackup 70 in FIG. 87 differs from the sensor stackup 30 in FIG. 6 in that a deformable layer 56 has patches 59 oriented at a diagonal with respect to the layer. In an embodiment, the patches 59 are approximately the size of the touch resolution of the sensor. In an embodiment, the patches 59 are at least the size of the touch resolution of the sensor.

Turning to FIG. 9, a further embodiment of a sensor stackup 60 is shown. The sensor stackup 60 includes a sensor layer 10, a flexible layer 25 and a deformable layer 66. In an embodiment, a top surface 28 and backing layer 22 are provided. In an embodiment, one or both of the top surface 28 and backing layer 22 include a conductive layer. In an embodiment, contact and/or pressure on the top surface 28 (or if no top surface is present, on the deformable layer 66) will displace one or more of the patches 69 in the deformable layer 66 with respect to the sensor layer 10, and thus cause a change in the capacitive coupling between the conductors 12, 14. In an embodiment, contact and shear on the top surface 28 (or if no top surface is present, on the deformable layer 66) will displace one or more of the patches 69 in the deformable layer 66 with respect to the sensor layer 10, and thus cause a change in the capacitive coupling between the conductors 12, 14. In an embodiment, flexible layer 25 is made from a deformable memory material such as a memory foam so that it will return to its original shape when pressure is not applied.

Turning to FIG. 10, yet a further embodiment of a sensor stackup 65 is shown. The sensor stackup 65 includes a sensor layer 10, a flexible layer 25, a deformable layer 66 and a top surface 29. In an embodiment, the top surface 29 comprises ridges. In an embodiment, the top surface 29 comprises bumps. In an embodiment, the top surface 29 comprises dimples. In an embodiment, the top surface 29 comprises embossed areas. In an embodiment, the top surface 29 comprises protrusions. In an embodiment, a backing layer 22 is provided. In an embodiment, one or both of the top surface 28 and backing layer 22 include a conductive layer. In an embodiment, contact and/or pressure on the top surface 29 will displace one or more of the patches 69 in the deformable layer 66 with respect to the sensor layer 10, and thus cause a change in the capacitive coupling between the conductors 12, 14. In an embodiment, contact and shear on the top surface 29 will displace one or more of the patches 69 in the deformable layer 66 with respect to the sensor layer 10, and thus cause a change in the capacitive coupling between the conductors 12, 14. In an embodiment, flexible layer 25 is made from a deformable memory material such as a memory foam so that it will return to its original shape when pressure is not applied.

Figure 11:
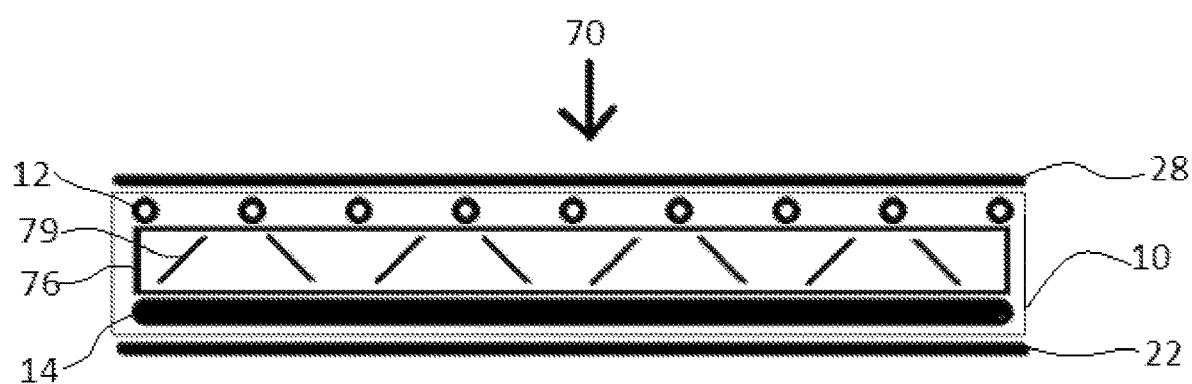
FIG. 11 is an illustration of yet a further embodiment of a sensor stackup having varied diagonal conductive elements and an integrated sensor and deformable layer for a pressure or shear sensor.

Turning to FIG. 11, yet another further embodiment of a sensor stackup 70 is shown. The sensor stackup 70 includes a sensor layer 10, having a deformable layer 76 therewithin, and a top surface 29 thereabove. Deformable layer 76 comprises patches 79, which may be positioned and oriented in numerous ways. In an embodiment, a backing layer 22 is provided. In an embodiment, one or both of the top surface 28 and backing layer 22 include a conductive layer. In an embodiment, contact and/or pressure on the top surface 29 will displace one or more of the patches 79 in the deformable layer 76 with respect to the sensor layer 10, and thus cause a change in the capacitive coupling between the conductors 12, 14. In an embodiment, contact and shear on the top surface 29 will displace one or more of the patches 79 in the deformable layer 76 with respect to the sensor layer 10, and thus cause a change in the capacitive coupling between the conductors 12, 14. In an embodiment, deformable layer 76 is made from a deformable memory material such as a memory foam so that it will return to its original shape when pressure is not applied.

With reference to FIGS. 5-11, patches may be oriented in a variety of manners. For example, horizontal, vertical and diagonal patches may be employed. Similarly, a variety of sizes and shapes of patches may be employed. This disclosure is not intended to be limited to the specific embodiments shown, rather, numerous combinations of patch size, shape, orientation and position are contemplated by this disclosure. Moreover, patch size, shape, orientation and position need not be homogenous through the flexible or deformable layer. For example, vertical and horizontal patches can be used in the same embodiment. Similarly large and small patches can be used in the same embodiment. Likewise, triangular and square patches can be used in the same embodiment. Moreover, various combinations of the foregoing are both permissible within the scope of this disclosure, and will be apparent to a person of skill in the art in view of this disclosure. In various embodiments, the patches comprise conductive or high dielectric materials, and may be made from, mixed with, or coated with such conductive or high dielectric materials. In an embodiment, the patches are square. In an embodiment, the patches are rectangular. In an embodiment, the patches are in the shape of a parallelogram. In an embodiment, the patches are diamond shaped. In an embodiment, the patches are triangular. In an embodiment, the patches are thin cylinders, e.g., wire. In an embodiment, the patches are disks. In an embodiment, at least two different patch shapes are employed. In an embodiment, at least two different patch shapes are embedded in the deformable layer. In an embodiment, the patches are isolated from the top surface and the sensor layer by the deformable layer, and no separate insulation is required.

In an embodiment, the conductive patches change position or orientation due to touching actions. For example, in a 2-D pressure sensor with a ribbed or bumped surface, rubbing actions could cause the surface of the sensor stack up to translate relative to the other layers, causing a shear in the stackup. This shear could partially rotate conductive patches (e.g., which were in a non-horizontal orientation pre-shear), allowing the shear motion to change the row-column capacitive coupling, and thus allowing the shear motion to be sensed by the capacitive sensor.

In an embodiment, several types of the disclosed 2-D pressure sensors are combined. For example, to increase dynamic range (i.e. the ability to sense both strong touch pressure and light touch pressure), multiple 2-D pressure sensors can be stacked. In an embodiment, a sensor designed to detect light pressure is placed towards the top of the stack (toward the touches), so that it can sense light pressure touches. Stronger touches may overpower the light-touch sensor, causing it to give an inaccurate or off-scale reading. The sensor layer 10 can be employed as a strong touch pressure sensor which can sense the characteristics of a strong touch. Thus, in an embodiment such as the one illustrated in FIGS. 9 and 10, an additional sensor layer (not shown) similar to the one in sensor layer 10 may be placed between the deformable layer 66 and the top surface 28 or 29. In an embodiment, the conductors of such additional sensor layer would remain substantially equidistant from the patches 69, and thus the patches 69 may have limited if any effect on the capacitance between the conductors 12, 14. In an embodiment, an additional sensor layer (not shown), an insulating layer not shown and a conductive layer (not shown) are placed between the top surface 28 or 29 and the deformable layer 66. Other variations will be apparent to one of skill in the art in view of this disclosure.

In an embodiment, sensors used for tangential pressure or shear sensing (e.g. the rubbing sensing above) could be combined with sensors for perpendicular pressure sensing in a similar way. In an embodiment, the shear sensor may be better suited on top (i.e., closer to the direction the touches are coming from), allowing both kinds of touches to be sensed simultaneously.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

The invention claimed is:

1. A sensor stackup comprising:
   sensor layer having top side and a bottom side, the sensor layer having at least one drive conductor and at least one sense conductor;
   a deformable layer having a top side and a bottom side, the deformable layer being deformable as a result of contact between the sensor stackup by an outside object;
   the sensor layer and the deformable layer being positioned within the sensor stackup such that the top side of the sensor layer is closer to the bottom side of the deformable layer than it is to the top side of the deformable layer;
   the deformable layer having a plurality of patches therewithin, the patches being insulated from the sensor layer, and the patches being displaced with respect to the sensor layer by deformation of the deformable layer, thereby causing a change in the capacitive coupling between the at least one drive conductor and at least one sense conductor.

2. A sensor stackup claimed in claim 1, further comprising:
   top surface positioned on the outer side of the deformable layer, the top surface being adapted for contact with the outside object.

3. A sensor stackup claimed in claim 2, further comprising:
   backing layer positioned below the sensor layer.

4. A sensor stackup claimed in claim 3, wherein the top surface and the backing layer each comprise a conductive layer.

5. A sensor stackup claimed in claim 2, wherein the top surface comprises at least one feature selected from the group consisting of: ridges, bumps, dimples, embossed areas, protrusions.

6. A sensor stackup claimed in claim 5, wherein the feature provides better tangential grip between the top surface and the outside object.

7. A sensor stackup comprising:
   sensor layer having top side and a bottom side, the sensor layer having at least one drive conductor and at least one sense conductor;
   a deformable layer having a top side and a bottom side;
   a flexible layer having a top side and a bottom side, the flexible layer having a plurality of patches therewithin;
   the deformable layer being deformable as a result of contact between the sensor stackup by an outside object;
   the sensor layer and the deformable layer being positioned within the sensor stackup such that the top side of the sensor layer is closer to the bottom side of the deformable layer than it is to the top side of the deformable layer;
   the deformable layer and the flexible layer being positioned within the sensor stackup such that the bottom side of the flexible layer is closer to the top side of the deformable layer than it is to the bottom side of the deformable layer;

the patches being insulated from the at least one drive conductor and the at least one sense conductor, and the patches being displaced with respect to the sensor layer by deformation of the deformable layer, thus causing a change in capacitive coupling between the at least one drive conductor and at least one sense conductor.

8. A sensor stackup claimed in claim 7, further comprising:
top surface positioned on the top side of the flexible layer, the top surface being adapted for contact with the outside object.

9. A sensor stackup claimed in claim 8, further comprising:
backing layer positioned below the sensor layer.

10. A sensor stackup claimed in claim 9, wherein the top surface and the backing layer each comprise a conductive layer.

11. A sensor stackup claimed in claim 8, wherein the top surface comprises at least one feature selected from the group consisting of: ridges, bumps, dimples, embossed areas, protrusions.

12. A sensor stackup claimed in claim 11, wherein the feature provides better tangential grip between the top surface and the outside object.

13. A sensor for sensing contact with an outside object, the sensor comprising:
a sensor stackup comprising:
top surface, having an outer skin adapted for contact with the outside object;
deformable layer below the top surface in the stackup, the deformable layer comprising a plurality of patches, each of the plurality of patches comprising conductive or high dielectric material;
capacitive sensor layer below the top surface in the stackup, the capacitive sensor layer comprising conductors, the conductors being insulated from the patches;
each of the plurality of patches configured to be displaced with respect to the capacitive sensor layer in response to at least one specific contact with the outside object;
backing layer below the capacitive sensor layer in the stackup; and
capacitive sensor circuitry operatively connected to the capacitive sensor layer, the capacitive sensor circuitry configured to detect changes in capacitive coupling between the conductors of the capacitive sensor layer resulting from displacement of the patches with respect to the capacitive sensor layer.

14. The sensor of claim 13, the sensor stackup further comprising:
conductive layer below top surface and above the deformable layer in the stackup.

15. The sensor of claim 13, the sensor stackup further comprising:
conductive layer below the capacitive sensor layer in the stackup.

16. The sensor of claim 13, the sensor stackup further comprising:
first conductive layer below top surface and above the deformable layer in the stackup; and
second conductive layer below the capacitive sensor layer in the stackup.

17. The sensor stackup of claim 13, wherein the at least one specific contact is selected from the group consisting of: pressure and shear.

18. The sensor stackup of claim 13, wherein the deformable layer is integrated with the capacitive sensor layer.

19. The sensor stackup of claim 18, wherein
the conductors comprising a first group of conductors and a second group of conductors; and
the deformable layer is between the first group of conductors and the second group of conductors in the capacitive sensor layer.

* * * * *